(12) United States Patent
Tröltzsch et al.

(10) Patent No.: US 11,453,976 B2
(45) Date of Patent: Sep. 27, 2022

(54) IMPREGNATION SYSTEM AND METHOD FOR IMPREGNATING A TEXTILE FABRIC FOR COMPOSITE COMPONENTS

(71) Applicant: KARL MAYER Technische Textilien GmbH, Chemnitz (DE)

(72) Inventors: Jürgen Tröltzsch, Chemnitz (DE); René Glöckner, Freiberg (DE)

(73) Assignee: KARL MAYER Technische Textilien GmbH, Chemnitz (DE)

(*) Notice: Subject to any disclaimer, the term of this patent is extended or adjusted under 35 U.S.C. 154(b) by 4 days.

(21) Appl. No.: 16/807,925

(22) Filed: Mar. 3, 2020

(65) Prior Publication Data

US 2020/0283951 A1 Sep. 10, 2020

(30) Foreign Application Priority Data

Mar. 7, 2019 (EP) .................................... 19161304

(51) Int. Cl.
B32B 38/08 (2006.01)
D06N 3/04 (2006.01)
(Continued)

(52) U.S. Cl.
CPC ........... D06N 3/045 (2013.01); B29C 70/083 (2013.01); B29C 70/504 (2013.01);
(Continued)

(58) Field of Classification Search
CPC ...... B29C 70/56; B29C 70/504; B29C 70/506
See application file for complete search history.

(56) References Cited

U.S. PATENT DOCUMENTS 4,219,524 A * 8/1980 Miller .................. B29C 70/508
264/216
5,201,979 A * 4/1993 Koba .................... B29C 70/504
100/212
(Continued)

FOREIGN PATENT DOCUMENTS

DE 2856506 A1 11/1979
DE 60003766 T2 6/2004
(Continued)

OTHER PUBLICATIONS

European Patent office search report for EP Application No. 19161304.1, dated Sep. 16, 2019.
(Continued)

Primary Examiner — Scott W Dodds
(74) Attorney, Agent, or Firm — Marshall, Gerstein & Borun LLP

(57) ABSTRACT

An impregnation system and a method for impregnating a textile fabric for composite components are described. A matrix 2 can be applied to a textile fabric 1 in such a way that the matrix 2 penetrates it at least partially and/or at least on one side. A first and a second endless belt 1 each designed as a belt loop are provided for the impregnation system. Between the first 4 and the second belt loop 5, the textile fabric 1 can guided on the mutually facing surfaces 6 of the belt loops and can be impregnated there. The deflection rollers 7 are provided in the respective belt loop 4, 5 of the respective endless belts at the deflection areas, with at least one roller being adjustable in the direction of the mutually facing surfaces 6 of the belt loops 4, 5. By adjusting the rollers 8 in the y direction, the wrap angle and thus the pressure exerted on the textile fabric during impregnation is controlled.

4 Claims, 3 Drawing Sheets

(51) Int. Cl.
*D06N 3/00* (2006.01)
*D06N 3/12* (2006.01)
*B29C 70/50* (2006.01)
*B32B 37/20* (2006.01)
*B29C 70/08* (2006.01)
*B32B 37/10* (2006.01)
*D06B 3/10* (2006.01)
*B29C 43/48* (2006.01)
*B32B 37/00* (2006.01)
*B29D 99/00* (2010.01)

(52) U.S. Cl.
CPC ........ *B32B 37/1027* (2013.01); *B32B 37/203* (2013.01); *B32B 38/08* (2013.01); *D06B 3/10* (2013.01); *D06N 3/0002* (2013.01); *D06N 3/0006* (2013.01); *D06N 3/0088* (2013.01); *D06N 3/125* (2013.01); *B29C 2043/483* (2013.01); *B29D 99/001* (2013.01); *B32B 37/0046* (2013.01); *B32B 2305/02* (2013.01); *B32B 2305/076* (2013.01); *B32B 2305/18* (2013.01); *B32B 2309/12* (2013.01); *D06N 2203/042* (2013.01); *D06N 2203/065* (2013.01); *D06N 2205/20* (2013.01)

(56) References Cited

U.S. PATENT DOCUMENTS

2012/0273989 A1\* 11/2012 Graf ........................ B29C 31/08
425/297
2016/0271860 A1 9/2016 Mashima et al.

FOREIGN PATENT DOCUMENTS

| DE | 102009046670 A1 | 5/2011 |
| EP | 0013548 B1 | 5/1982 |
| JP | H05228933 A | 9/1993 |

OTHER PUBLICATIONS

Miller, A. et al., "Impregnation Techniques for Thermoplastic Matrix Composites," *Polymers and Polymer Composites, Rapra Technology*, vol. 4, No. 7, Oct. 11, 1996.

\* cited by examiner

IMPREGNATION SYSTEM AND METHOD FOR IMPREGNATING A TEXTILE FABRIC FOR COMPOSITE COMPONENTS

CROSS-REFERENCE TO RELATED APPLICATION

Priority is claimed to European Application No. 19 161 304.1, filed Mar. 7, 2019, the entire contents of which are hereby incorporated by reference.

FIELD OF THE DISCLOSURE

The invention relates to an impregnation system and a method for impregnating a textile fabric for composite components.

BACKGROUND

The process for impregnating a textile fabric for composite components is implemented using an impregnation system. When impregnating textile fabrics, double belt presses, calender systems or laminating systems are used, in which the materials to be impregnated are continuously connected or even impregnated via roller systems with pressurization or by setting a defined gap between the roller systems. Because the rollers are generally arranged vertically one above the other, a line pressure is exerted by the respective rollers when the material to be impregnated is pressurized accordingly. The disadvantage here is that, at high production speeds, this leads to an abrupt or short-term, possibly also relatively high, pressurization. In order to alleviate this effect somewhat, stiff steel belts with high tensile force relief have been used in order to maintain a certain compressive force in the direction of the thickness of the material to be impregnated and conveyed through the corresponding system, even between the roller systems. It is common for several pairs of rollers to be arranged one behind the other at short intervals. In these known roller assemblies, pressure is mainly exerted on the material to be connected when the line pressure occurs between opposing rollers. In between there is an extensive pressure relief.

When impregnating, material systems are usually connected to one another, in which a continuous flow of one of the materials is necessary; this is usually the impregnating agent, also called matrix in the case of composite materials. If the impregnating agent is to be distributed evenly, a continuously acting pressurization must also be implemented. This is necessary in particular in the case of textile fabrics made of reinforcing fibers, such as glass fibers, carbon fibers or aramid fibers, which are to be impregnated with the matrix.

US 2016/0271860 A1 describes a method for producing a layer-like fiber-reinforced plastic as a composite material, in which a thermoplastic-matrix and a reinforcing fiber layer are connected to one another. Belt systems are arranged one above the other in the sense of endless belts, between which the material to be connected or the material to be impregnated is pressed accordingly when the distance between the opposing rollers changes. Despite a relatively large number of roller pairs arranged relatively close to one another and one behind the other, the problem remains that the opposing rollers make line contact with the material to be impregnated, but between the roller pairs the material to be connected is depressurized or at least very low pressure is present compared to that caused by the rolling pressure immediately applied. This known system is a double belt press.

DE 600 03 766 T2 discloses a method and a device for producing a composite belt which is formed from reinforcing fibers and a thermoplastic material. Three rollers are each arranged with a gap to one another, the distance being such that an upper roller dips into the space between the two lower rollers. A material belt to be impregnated is now conveyed through the roller system, a composite belt being impregnated by the application of pressure. After being impregnated, these composite belts are also referred to as so-called prepregs. In order to be able to implement different thickness ratios for different requirements of the material to be impregnated, in this known system the upper individual roller is directed in the direction of the material to be impregnated, i.e. is height-adjustable perpendicular to the rollers. Circulating belts as in double belt presses are not described.

EP 0 013 548 B1 describes a device for dewatering water-containing substances. Sludge is preferably passed between two sieve belts over a plurality of deflecting rollers connected in series. The belt tension is adjustable by means of a press roller adjustment. A series of pressure rollers is provided which press the screen belts against the press rollers. Both screen belts are alternately guided in a closed circuit over the upper area and then over the lower area of adjacent rollers. This does not describe independent belt systems between which the material to be treated is guided.

GENERAL DESCRIPTION

In contrast, the object of the invention is to provide a method and an impregnation system for realizing the method for impregnating a textile fabric for composite components, in which the impregnating agent which is to be connected to a textile fabric is subjected with a pressure applied as evenly as possible during conveying through the impregnation system, so that the impregnating agent can penetrate the textile fabric evenly and in a well distributed manner, in order to create a so-called prepreg of good quality.

According to a first aspect of the invention, a textile fabric for composite components can be impregnated by means of the impregnation system according to the invention, it being possible to apply a matrix to the fabric in such a way that the matrix penetrates it at least partially and/or at least on one side. The matrix is a flowable material layer which penetrates the generally porous textile fabric after the matrix has been brought together with the textile fabric. The matrix can penetrate the textile fabric completely at all points and preferably substantially uniformly. However, it is also possible for the fabric to be partially penetrated by the matrix. By partially or completely penetrating the textile fabric in the entire area, corresponding mechanical properties of the later impregnated textile fabric, which is also referred to as prepreg, are specifically produced. Depending on the application, the matrix can penetrate the textile fabric on one side. This means that it has been applied to one side of the textile fabric and penetrates the textile fabric from one side within the impregnation system. It is also preferably possible for the matrix to be applied to both sides of the textile fabric and for the same to be impregnated from both sides.

According to the invention, the impregnation system has a first and a second endless belt, each of which is designed as a belt loop. Rollers are arranged within each belt loop, over which the endless belt runs and, so to speak, encloses the rollers located within the belt loop. The two belt loops, which have mutually facing surfaces and enclose within rollers, guide the textile fabric between the mutually facing surfaces, the textile fabric being impregnable at the contact point between the two belt loops as it passes through the textile fabric. The belt loops have deflection rollers at their respective deflection areas, of which at least one roller is adjustable in the direction of the surfaces of the belt loops facing one another. This represents the y-direction. Since the deflection rollers can be displaced in the y-direction, a corresponding pressure is exerted on the matrix by a pressure area determined by the contact of the belt loops, i.e. the flowable material layer, so that the latter impregnates the porous material layer in the form of the textile fabric, i.e. penetrates the porous material layer.

An adjustment of the deflection rollers in the y-direction means that the facing belt loops can develop a different pressure at their point of contact, with which the matrix can be pressed into the textile fabric and the latter can thus be impregnated.

It is also preferably possible for the deflecting rollers to also be displaceable or adjustable in the x-direction, so that the endless belts of the respective belt loop can be tensioned to a greater or lesser extent, as a result of which the pressure conditions of the textile fabric to be impregnated as it passes between the contact points of the two facing belt loops are adjustable.

A further roller is preferably arranged within at least one of the two belt loops and is adjustable in the direction of the surfaces of the two belt loops lying opposite one another. The further roller is therefore adjustable in the y-direction. This further roller can be adjustable alone. However, it is also possible that both the further roller and the deflecting rollers can be displaced independently of one another in the y-direction and can be adjusted to such an extent that the rollers are either in one plane with respect to their axes of rotation or are so far apart that the rollers are, due to their so to speak immersion between the rollers of the opposite belt loop, no longer in direct contact with the other side of the belt loop. No longer in contact with the other side of the belt loop means that the outer part of the endless belt, which is returned, comes into contact again with the fabric to be impregnated at the entry of the impregnation system. While the endless belt is rewinding on the outside of the belt loop, this outer area does not experience any deflection despite the slackness of the endless belt of the respective belt loop. The slackness has the advantage that the roller system designed as a circulating goods transport system enables the infeed of the rollers to one another and thus the looping length of the slack endless belt of the respective belt loop around a respective roller. This goods transport system thus consists of at least two belt loops in the manner of conveyor belts, between which a material system to be impregnated is transported and processed. The temperature environment for the textile fabric to be impregnated can be set in a range between room temperature or ambient temperature and 300° C.

The material system to be impregnated is carried between the two belt loops. The material system has several layers of different material, of which at least one layer consists of a porous material B, the actual textile fabric, and at least one layer of material A, the matrix, which has a flowable state in the specified temperature environment, the dynamic viscosity being between 10 and 1000 Pa*s, preferably 50 and 500 Pa*s. Material A preferably consists of thermoplastic materials, in particular polyolefins or polyamides, which have a molten physical state in the specified temperature environment and have a viscoelastic material behavior.

In summary, it can be stated that a defined wrap angle of the textile fabric to be impregnated around the rollers can be set by a specific infeed of the rollers in the y-direction. By feeding a roller, in particular the deflection roller, in the x-direction, the tensile force in the endless belt can be set in a targeted manner in the respective belt loop. The impregnation system according to the invention, which also represents a goods transport system, has the advantage that the quality and reliability and isotropy of the properties of the textile fabric impregnated with matrix in the form of a prepreg have the advantage that the material system to be impregnated is not only continuously subjected to pressure on the deflection rollers, but this pressure is always applied perpendicular to the roller surface in the thickness direction of the material system which is impregnated. This pressurization acts over a defined period, which results from the transport speed of the textile fabric to be impregnated and the circumferential arc, which is defined by the wrap angle through which the textile fabric to be impregnated passes. Due to the uniform pressurization in the impregnation system, this pressure is transferred to the material system, which is preferably built up in layers. This pressure transfer in the uniform manner, as is guaranteed by the invention, leads to the flowable material layer A impregnating the porous material layer B in the form of the textile fabric evenly in the thickness direction due to the uniform pressure acting.

Another advantage of the invention is that a wrap angle can be individually adjusted due to the infeed of the rollers in the y-direction. The pressure acting in the thickness direction builds up along the belt loop in the transport direction. This allows air to escape in the porous layer against the direction of transport.

At least one of the two belt loops preferably has a plurality of further rollers which are arranged between the deflecting rollers and can be immersibly adjusted in the belt loop region of the other belt loop with at least one directional component with respect to the y-direction perpendicular to the facing surfaces of the two belt loops. Relatively large distances between rollers within the upper belt loop system allow further rollers of the lower belt loop system to be immersed there relatively deeply.

The adjustable deflecting rollers are further preferably adjustable independently of one another. The wrap angle and thus the pressure exerted on the textile fabric to be impregnated can thus be varied at any place and at any time. It is thereby also possible that the pressure and thus the penetration depth of the matrix within the textile fabric can be varied application-specifically along the conveying direction of the textile fabric by the impregnation system.

The adjustment of the at least one further roller in the y-direction when immersed in the other belt loop with respect to its immersion depth can be controlled in such a way that the textile fabric has a variable wrap angle around the further roller. By adjusting the deflection rollers also in the y-direction, i.e. in the direction of the surfaces of the endless belts facing each other, the contact pressure of the textile fabric on the further roller on the textile fabric can thus be controlled. The controllability of the contact pressure has the advantage that, for different materials, for different textile fabrics and of course also for different matrix materials, the contact pressure required or optimal for the impregnation of the textile fabric can be controlled in the sense of reaching predetermined degrees of impregnation.

According to a further preferred embodiment, the further rollers are curved in a ball shape or concave along their axis of rotation on their outer contour. The deviation from a cylindrical shape of the rolls can be advantageous based on the technological or physical conditions of the textile fabrics in connection with the desired impregnation depth.

In addition to a corresponding design of the outer shape, possibly deviating from a cylindrical shape, it can be provided that the further roller or the further rollers can be moved, in particular vibrated, in their longitudinal direction. The additional component of movement of the further rollers in their longitudinal direction can contribute to the fact that better impregnation, i.e. penetration of the fabric, is achieved. The textile fabric is a porous material, which is impregnated with the matrix during the impregnation by filling up the spaces between the individual fibers with the matrix. Vibration of the further roller can improve the penetration of the textile fabric with the matrix, so that a very high degree of impregnation can be achieved.

In order to increase the flowability of the matrix for the impregnation of the textile fabric, it can be provided according to a further exemplary embodiment that at least one further roller as well as all other rollers can be temperature-controlled so that the viscosity of the matrix can be lowered by increasing the temperature, to improve the flow properties in the porous fabric in the sense of penetration.

So that the textile fabric is treated gently during the impregnation with the matrix, i.e. conveyed gently through the impregnation system by means of the endless belts and thereby being impregnated, the endless belts are preferably designed to be temperature-stable, low-friction and non-stick coated. In particular, the non-stick coating ensures that the textile fabric impregnated in the impregnation system does not adhere to the endless belts when leaving the impregnation system and is therefore easily removed, and can accordingly be stored as a prepreg until final use.

The textile fabric is preferably a unidirectional layer comprising fibers or a multi-axial scrim. However, it is also possible that the textile fabric is a fleece or a woven fabric.

The matrix is preferably a polymer matrix and more preferably a thermoplastic matrix. The advantage of using a thermoplastic matrix is that the viscosity of the matrix material can be reduced by increasing the temperature, so that a viscosity which is desired in accordance with the viscosity of the thermoplastic material can be set via temperature control. This allows the penetration of the matrix into the textile fabric to be controlled for different materials and different manufacturing conditions. The starting material of the thermoplastic matrix, which is fed to the impregnation system, is preferably a limp, flat structure in the form of a film or a fleece.

According to a second aspect of the invention, a method for impregnating a textile fabric for composite components is provided, which is impregnated with a matrix or a matrix material. By impregnating the textile fabric with a matrix material, the textile fabric is impregnated and forms a so-called prepreg. This is particularly important for thermoplastic matrix materials in that the prepregs are relatively stiff and easy to transport, but for practical use they often have to have a corresponding degree of flexibility and drapability, which can be achieved by the thermoplastic material and thus the textile fabrics impregnated with the thermoplastic material being heated, as a result of which the prepreg can be brought into a desired shape in three-dimensional applications. For the impregnation, the textile fabric is guided between two belt loops each formed from an endless belt and running over deflection rollers. The contact pressure with which the deflection rollers, after the textile fabric is brought together with the thermoplastic material, is determined by the tension of the endless belts and by adjusting the rollers in the direction of the surfaces of the belt loops facing one another (i.e. in the y-direction) and by varying the wrap angle of the endless belts on the rollers. The rollers are shifted in the y-direction, which is also carried out, above all if the textile fabric is at least partially impregnated with the matrix, in particular on both sides, so that the textile fabric is completely impregnated when inside the belt loops additional rollers are provided, which, due to their displacement in the y-direction, immerse the rollers in the belt loop opposite. With a higher degree of wrapping of the respective roller with the endless belt, the pressure increases, which acts on the textile fabric together with the matrix material used for the impregnation as it passes through the impregnation system.

The textile fabric is preferably completely impregnated.

Finally, the textile fabric is preferably a unidirectional layer or a multi-axial layer, which is impregnated with a matrix, in particular a thermoplastic matrix.

A downstream measuring system is preferably provided for the impregnation system or an impregnation module, by means of which a continuous and non-destructive measurement of the width and the thickness of the material leaving the impregnation system takes place. The thickness of the material is measured across its entire width. The mean thickness is compared to a reference value, the compaction thickness, for the width that is also measured. The compacting thickness results from the given input variables of the materials used, such as basis weight, thickness, density, tex number, and represents a theoretically achievable characteristic value. The deviation of the measured average thickness from the theoretical compaction thickness in percent gives the proportion of pores and thus the degree of impregnation.

BRIEF DESCRIPTION OF THE DRAWINGS

Further advantages, possible applications and details of the impregnation system according to the invention will now be explained in detail using the following drawing. In the drawing.

DETAILED DESCRIPTION

Figure 1:
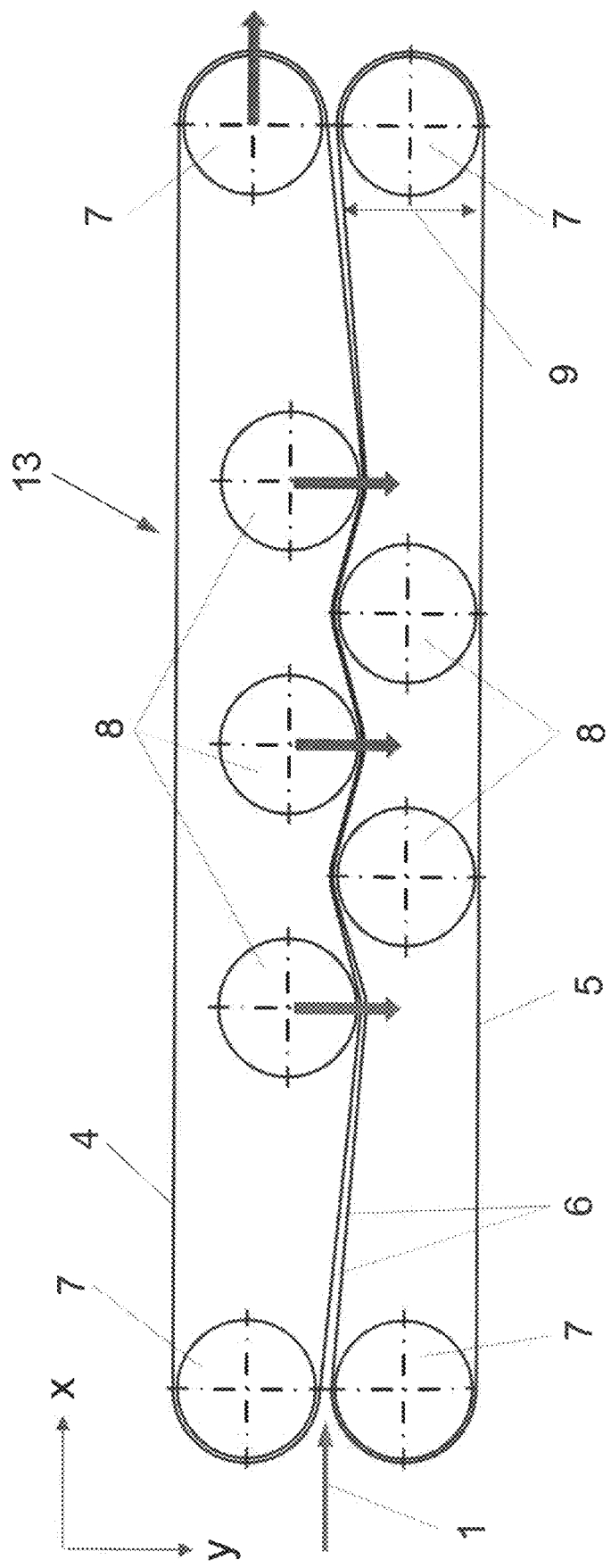
FIG. 1 shows an impregnation system or an impregnation module with two mutually assigned belt loops with respective deflection rollers and further rollers.

FIG. 1 shows an impregnation system or an impregnation module 13 (see FIG. 3), which has two belt loops 4, 5 assigned to each other. The first 4 and the second belt loop 5 are formed by respective endless belts which have deflection rollers 7 at their deflection areas and additionally have a plurality of further rollers 8 arranged between the respective deflection rollers 7.

The deflection rollers, over which the respective endless belts are guided, span a belt loop region 9 between the top and the bottom. The first belt loop 4 shown above in FIG. 1 has three further rollers 8 arranged between the two deflection rollers 7 and forms a surface 6 which is assigned to the second belt loop 5 shown below in FIG. 1. That is, the lower side of the belt loop 4 and the upper side of the belt loop 5 are facing towards each other. The textile fabric 1 is passed between the inclined surfaces 6 and subjected to a corresponding pressure, which is intended to ensure that the textile fabric consists of a pure textile fabric 3 and a matrix 2 in the form of, for example, a film or a fleece. The deflection rollers 7 are adjustable in the x-direction, which is indicated by the horizontal thick arrow on the upper right deflection roller 7. As a result, the tension of the endless belt within the first belt loop 4 can be changed. Arranged within the belt loop 4 are three further rollers 8, which are at a distance from one another which is large enough that the rollers 8 in the belt loop 4 can immerse with a certain depth in the belt loop region 9 of further rollers 8, which are arranged in the second belt loop 5. Likewise, the further rollers 8 of the second belt loop 5 can immerse into the belt loop region of the first belt loop 4, not shown, and likewise also between the further rollers 8 in the second belt loop 5, which are spaced from one another. By adjusting the other rollers 8 in the y-direction, the wrap angle that the textile fabric experiences in the region of the mutually facing surfaces 6 when conveying over the respective additional roller 8 is varied. The deeper the further roller immerses into the space between the further rollers 8 of the opposite belt loop, the greater the wrap angle. The wrap angle guarantees a substantially uniform pressurization of the textile fabric 1 together with the matrix 2, so that an substantially constant pressure can be exerted on the matrix 2 over a surface region, which penetrates evenly into the actual textile fabric 3 and accordingly causes an even distribution there.

If the other rollers 8 are displaced in the y-direction, this causes a shortening of the length of the belt loop, which is compensated for by a corresponding setting or adjustment of the deflection rollers 7 in the x direction. However, it is also conceivable not to adjust the deflection rollers 7 in the x-direction when the further rollers 8 are adjusted in the y-direction for immersion in the belt loop region 9 of the respective other belt loop 4 or 5, so that the belt tension of the respective belt loop is increased, as a result of which the pressure which forms on the textile fabric 1 together with the matrix 2 in the region of the wrap angle can be increased by the further roller 8.

Figure 2:
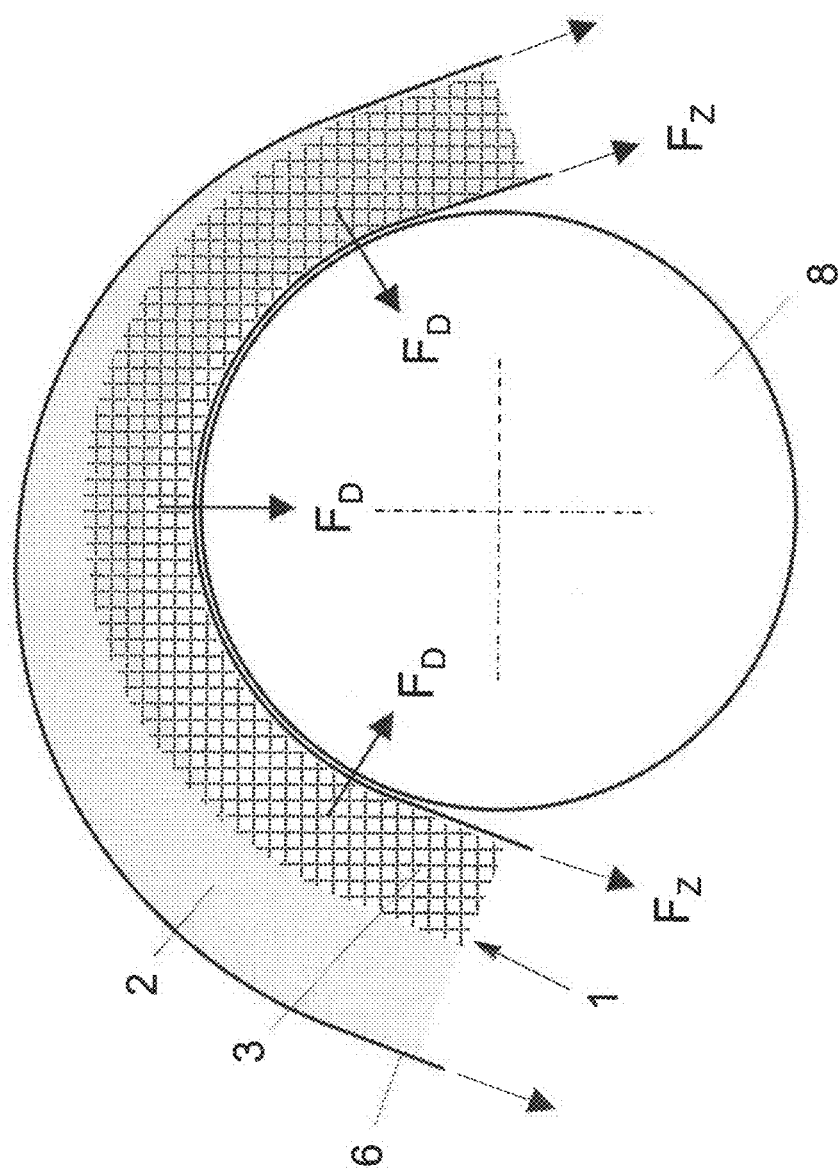
FIG. 2 shows a further roller within a belt loop showing the wrap angle through the textile fabric.

In FIG. 2 it is shown how the fabric consisting of a material layer A, the matrix, and the material layer B, the textile layer, is applied to the further roller 8 by the wrap angle, as a result of which a compressive force $F_D$ on the wrap angle in the region of the wrap angle textile fabric 1 is exercised. At the same time, a corresponding belt tension is generated in accordance with the adjustment of the deflection rollers 7 in the x-direction, which is shown in FIG. 2 by the tensile force $F_Z$ in the direction of the textile fabric 1. As a result, the corresponding pressurization when passing through the impregnation module is transferred to the layered material system, namely the textile fabric 1, which means that the flowable material layer of the matrix 2 impregnates the porous material layer of the textile layer 3 due to the pressure acting in the thickness direction. The pressure builds up along the textile fabric 1 in the conveying direction. This allows the air to escape from the porous layer against the direction of conveyance.

The impregnation module shown in principle in FIGS. 1 and 2 has the advantage that, via the adjustable wrap angle, the pressure force exerted and thus the respective length from a respective further roller 8 onto the textile fabric 1 for penetrating the matrix 2 into the porous textile material layer 3, i.e. the textile fabric 1, is adjustable. For this purpose, the deflection rollers 7 and expediently also the further rollers 8 within the respective belt loop 4, 5 can be varied in the y-direction. The deflecting rollers 7 can be adjusted at least in the x-direction in order to compensate for a reduction in length by adjusting the further rollers 8 in the y-direction for the respective belt loop 4, 5. If the deflecting rollers 7 are arranged one below the other in the impregnation system shown in FIG. 1, the adjustment in the y direction is dispensed with in the case of such an arrangement, since the pressure introduced linearly into the textile fabric is to be avoided. However, it is also possible for the first band loop 4 and the second band loop 5 to have a different length. In such a case, the deflection rollers 7 of the one belt loop 4 or 5 can of course immerse into the belt loop region 9 of the other belt loop 4 or 5. The deflecting rollers 7 can thus take over the function of the further rollers 8 arranged within a respective belt loop.

Figure 3:
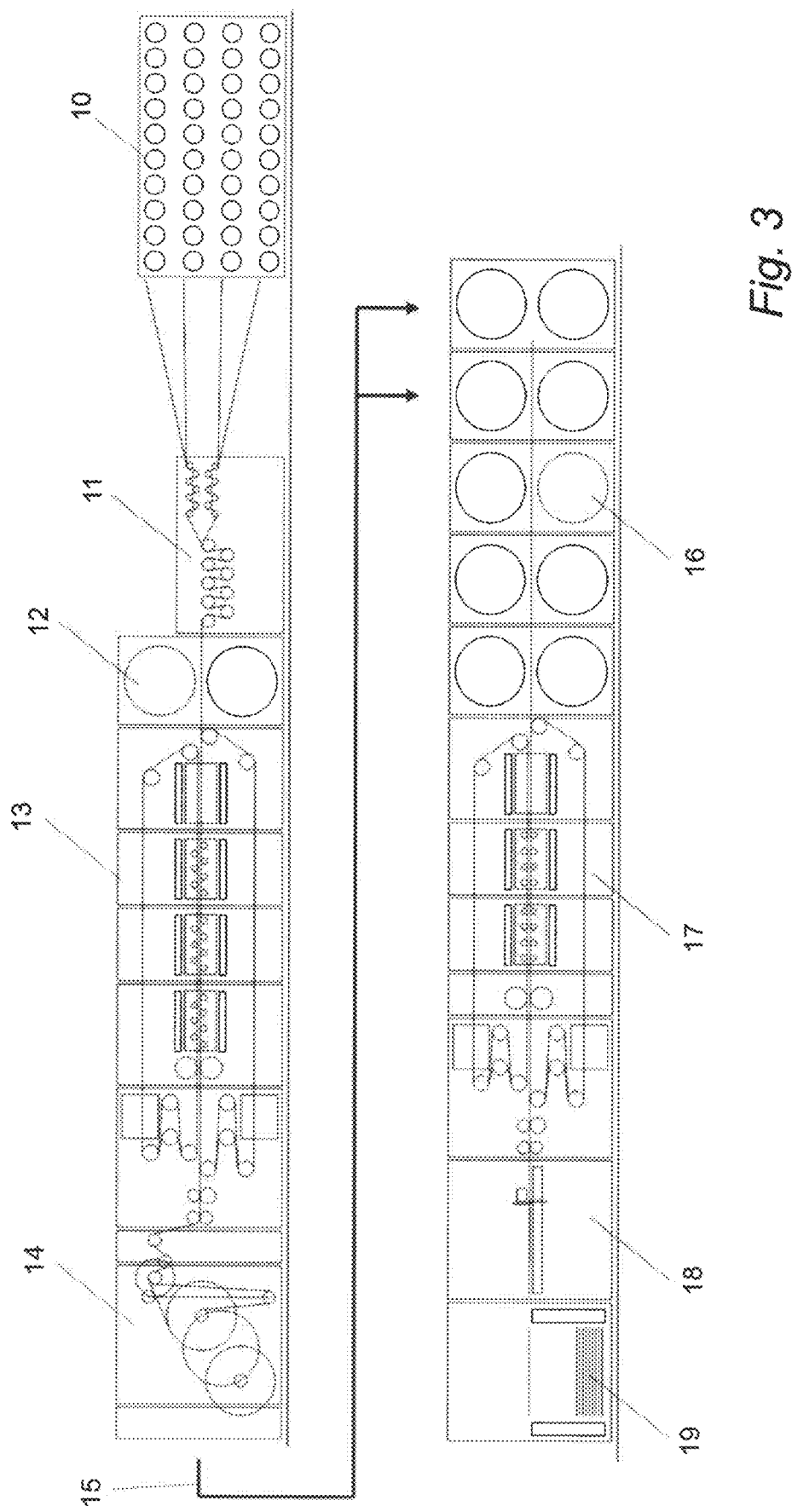
FIG. 3 shows a system made up of various modules for the production of impregnated unidirectional single-layer tapes and multi-layer composite semi-finished products with multiaxial reinforcement alignment with impregnation module.

FIG. 3 shows how an impregnation system is arranged as an impregnation module 13 in a complete system in the sense of a two-stage processing technology for the production of impregnated unidirectional single-layer tapes and multi-layer composite semi-finished products with multi-axial reinforcement alignment. The basic structure of such a complete system has a creel 10, from which a corresponding number of threads is drawn, which are combined in a unit, a spreading module 11, connected downstream of the creel 10, in such a way that the widest possible spreading is achieved in order to achieve the lowest possible mass per unit area. The spreading module 11 is followed by a dewinding unit 12, which has preferably wound up the matrix 2 as a film or fleece, so that the processing of the matrix 2 results in a flat structure 1, which has an actual textile layer 3 and a matrix layer 2, which when passing through the system are combined in such a way that the matrix 2 penetrates the porous textile layer 3. The system can be set so that the matrix material has completely penetrated into the porous textile layer. However, it is also possible for the matrix 2 to penetrate into the textile fabric from both sides of the textile layer 3. Furthermore, it is possible for the matrix 2 to completely penetrate the textile layer.

The dewinding unit 12 for the matrix 2 connects to the impregnation system 13, i.e. the impregnation module, which is also referred to as the consolidation module. The basic structure of this impregnation module is that which has already been described with reference to FIGS. 1 and 2. After the impregnation system, a winding is carried out in the downstream turret winder 14 with simultaneous turning of the impregnated textile fabric. In the exemplary embodiment according to FIG. 3, the textile fabric 1 after its impregnation is an impregnated UD tape 15, which is unwound in a tape dewinding unit 16 and fed to a laminating module 17. A laminating module is always used when additional layers are to be laminated to the impregnated textile fabric, which is done in the case of composite components which are intended to achieve a predetermined property. In a cross-cutting module 18 downstream of the laminating module 17, the impregnated and laminated textile fabric is cut into lengths which are placed on a pallet in the sense of palletizing 19. The semi-finished products produced in this way can be brought into appropriate shapes for further use due to the use of thermoplastics for the matrix material by heating, which is done at the place of use without a matrix 2 then having to be added under difficult conditions of use.

The invention claimed is:

1. A method for impregnating a textile layer (1) with a matrix (2) to form a textile fabric (3) for composite components, the textile layer (1) being a unidirectional layer or a multi-axial layer, the method comprising the following steps:

a) providing an impregnation module comprising a first and a second endless belt loop (4, 5) each running over deflection rollers (7) at respective deflection areas of the endless belt loops (4, 5), and wherein the endless belt loops (4, 5) each have surfaces (6) mutually facing each other;

b) applying the matrix (2) onto the textile layer (1) and carrying and guiding the matrix (2) and the textile layer (1) between the mutually facing surfaces of the endless belt loops (4, 5);

c) impregnating the textile layer (1) with the matrix (2) to form the textile fabric (3) in between the endless belt loops (4, 5) in the impregnation module by applying contact pressure perpendicularly in a Y-direction onto the textile layer (1) and the matrix (2) using a wrap angle of the endless belt loops (4, 5) over at least one further roller (8) arranged within the first or the second endless belt loop (4, 5) while the textile layer (1) and matrix (2) are running over the at least one further roller (8); and d) controlling the contact pressure onto the textile layer (1) and the matrix (2) by varying tension of the endless belt loops (4, 5) and by adjusting the deflection rollers (7) and the at least one further roller (8) independently from each other in the Y-direction of the mutually facing surfaces (6) to vary the wrap angle of the endless belt loops (4, 5) on the at least one further roller (8).

2. The method according to claim 1, wherein controlling the contact pressure is carried out such that the textile layer (1) is being completely impregnated by the matrix (2).

3. The method according to claim 1, wherein the matrix (2) is a thermoplastic matrix.

4. The method according to claim 1, wherein during impregnating, both sides of the textile layer (1) are impregnated by the matrix (2).

\* \* \* \* \*

UNITED STATES PATENT AND TRADEMARK OFFICE
CERTIFICATE OF CORRECTION

PATENT NO. : 11,453,976 B2
APPLICATION NO. : 16/807925
DATED : September 27, 2022
INVENTOR(S) : Jürgen Tröltzsch et al.

It is certified that error appears in the above-identified patent and that said Letters Patent is hereby corrected as shown below:

On the Title Page

At item (57), Line 5, "belt 1" should be -- belt 4, 5 --.

At item (57), Line 8, "can" should be -- can be --.

Signed and Sealed this
Twenty-first Day of March, 2023

Katherine Kelly Vidal
*Director of the United States Patent and Trademark Office*